United States Patent
Krecichwost et al.

(10) Patent No.: US 9,594,485 B1
(45) Date of Patent: Mar. 14, 2017

(54) ONLINE INFORMATION SYSTEM WITH SELECTABLE ITEMS FOR CONTINUOUS SCROLLING

(71) Applicant: Tribune Publishing Company, LLC, Chicago, IL (US)

(72) Inventors: Daniel Krecichwost, Clarendon Hills, IL (US); Jeremy Wayne Majors, Chicago, IL (US); Dennis J. Huh, Chicago, IL (US); Farha Abdul Sattar Mukri, Chicago, IL (US); James Thomas Burnett, Winter Springs, FL (US)

(73) Assignee: Tribune Publishing Company, LLC, Chicago, IL (US)

( * ) Notice: Subject to any disclaimer, the term of this patent is extended or adjusted under 35 U.S.C. 154(b) by 212 days.

(21) Appl. No.: 14/448,626

(22) Filed: Jul. 31, 2014

Related U.S. Application Data

(60) Provisional application No. 61/988,097, filed on May 2, 2014, provisional application No. 61/988,776, filed on May 5, 2014.

(51) Int. Cl.
  *G06F 17/00* (2006.01)
  *G06F 3/0484* (2013.01)
  *G06F 3/0481* (2013.01)

(52) U.S. Cl.
  CPC ........ *G06F 3/04842* (2013.01); *G06F 3/0481* (2013.01)

(58) Field of Classification Search
  None
  See application file for complete search history.

(56) References Cited

U.S. PATENT DOCUMENTS

| | | |
|---|---|---|
| 6,044,385 A | 3/2000 | Gross et al. |
| 6,575,832 B1 | 6/2003 | Manfredi et al. |
| 7,082,418 B2 | 7/2006 | Levy et al. |
| 7,159,178 B2 | 1/2007 | Vogt et al. |
| 7,320,105 B1 | 1/2008 | Sinyak et al. |
| 7,392,481 B2 | 6/2008 | Gewickey et al. |

(Continued)

OTHER PUBLICATIONS

Micek, Alex; "Screw Hashbangs: Building the Ultimate Infinite Scroll"; May 12, 2011; Tumbledry.org; http://tumbledry.org/2011/05/12/screw_hashbangs_building.*

(Continued)

*Primary Examiner* — Asher Kells
(74) *Attorney, Agent, or Firm* — McDonnell Boehnen Hulbert & Berghoff LLP

(57) ABSTRACT

A first document may be requested and received from a server device. Based on the first document, a web page may be rendered for display on a client device. The rendered web page may include a plurality of selectable items, each corresponding to a respective type of web page content. Via a user interface of the client device, a selection of a first selectable item of the selectable items may be received. Possibly responsive to receiving the selection of the first selectable item, a second document may be requested and received from the server device. The second document may include a first particular type of web page content corresponding to the first selectable item. The web page may be re-rendered for display on the client device to include content from both the first document and the second document.

16 Claims, 11 Drawing Sheets

(56) References Cited

U.S. PATENT DOCUMENTS

| | | | |
|---|---|---|---|
| 7,546,295 | B2 | 6/2009 | Brave et al. |
| 7,693,836 | B2 | 4/2010 | Brave et al. |
| 8,381,126 | B2 | 2/2013 | Gould |
| 8,595,644 | B1 | 11/2013 | Clark |
| 8,904,285 | B2 | 12/2014 | Watanabe et al. |
| 8,910,073 | B2 | 12/2014 | Mercer |
| 9,081,481 | B2 | 7/2015 | Gilbert et al. |
| 9,152,725 | B2 | 10/2015 | Wong et al. |
| 9,230,238 | B2 | 1/2016 | Zappa et al. |
| 9,361,392 | B1 | 6/2016 | Saylor et al. |
| 2002/0186252 | A1 | 12/2002 | Himmel et al. |
| 2003/0103090 | A1 | 6/2003 | Kelley et al. |
| 2003/0179239 | A1 | 9/2003 | Lira |
| 2004/0010508 | A1* | 1/2004 | Fest ............ G06F 17/3089 |
| 2004/0139400 | A1 | 7/2004 | Allam et al. |
| 2006/0038796 | A1 | 2/2006 | Hinckley et al. |
| 2006/0206813 | A1 | 9/2006 | Kassan |
| 2006/0236261 | A1 | 10/2006 | Forstall et al. |
| 2006/0265653 | A1 | 11/2006 | Paasonen et al. |
| 2007/0150368 | A1 | 6/2007 | Arora et al. |
| 2008/0134018 | A1 | 6/2008 | Kembel et al. |
| 2009/0138815 | A1 | 5/2009 | Mercer |
| 2009/0319942 | A1 | 12/2009 | Delia et al. |
| 2010/0058240 | A1 | 3/2010 | Bull et al. |
| 2011/0004519 | A1 | 1/2011 | Aleong et al. |
| 2011/0125594 | A1* | 5/2011 | Brown ............ G06Q 30/02 705/14.73 |
| 2012/0011430 | A1* | 1/2012 | Parker ............ G06F 3/0485 715/234 |
| 2012/0117481 | A1 | 5/2012 | Stevens et al. |
| 2012/0188164 | A1 | 7/2012 | Dey et al. |
| 2012/0210213 | A1 | 8/2012 | Watanabe et al. |
| 2012/0284597 | A1 | 11/2012 | Burkard et al. |
| 2013/0086511 | A1* | 4/2013 | Parsons ............ G06F 3/0483 715/784 |
| 2013/0179794 | A1 | 7/2013 | Eastham et al. |
| 2013/0275849 | A1 | 10/2013 | King et al. |
| 2014/0033099 | A1 | 1/2014 | Treitman et al. |
| 2014/0059420 | A1 | 2/2014 | Cole et al. |
| 2014/0236978 | A1 | 8/2014 | King et al. |
| 2014/0304576 | A1 | 10/2014 | Walton |
| 2014/0372230 | A1 | 12/2014 | Ray et al. |
| 2015/0007108 | A1* | 1/2015 | Ozcelik ............ G06F 3/0485 715/810 |
| 2015/0074513 | A1 | 3/2015 | Liang et al. |
| 2015/0149881 | A1 | 5/2015 | Breard et al. |
| 2015/0193554 | A1 | 7/2015 | Yang |
| 2015/0205475 | A1 | 7/2015 | Donelan et al. |
| 2015/0339402 | A1 | 11/2015 | Epstein |
| 2015/0356622 | A1 | 12/2015 | Dhawan et al. |
| 2016/0011766 | A1 | 1/2016 | Kosaka et al. |
| 2016/0012018 | A1* | 1/2016 | Do Ba ............ H04L 12/6418 715/234 |
| 2016/0132204 | A1 | 5/2016 | Maruyama |

OTHER PUBLICATIONS

Klauzinski, Philip; "jScroll: A jQuery Plugin"; 2014; jScroll.com.*
"HTML—force page scroll position to top at page refresh"; Stack Overflow; Jun. 29,2013; http://stackoverflow.com/questions/3664381/html-force-page-scroll-position-to-top-at-page-refresh.*
Krecichwost et al., U.S. Appl. No. 14/448,597, filed Jul. 31, 2014, 58 pages.
Krecichwost et al., U.S. Appl. No. 14/448,602, filed Jul. 31, 2014, 61 pages.
Krecichwost et al., U.S. Appl. No. 14/448,604, filed Jul. 31, 2014, 58 pages.
Krecichwost et al., U.S. Appl. No. 14/448,610, filed Jul. 31, 2014, 57 pages.
Krecichwost et al., U.S. Appl. No. 14/448,613, filed Jul. 31, 2014, 58 pages.
Krecichwost et al., U.S. Appl. No. 14/448,616, filed Jul. 31, 2014, 61 pages.
Krecichwost et al., U.S. Appl. No. 14/448,621, filed Jul. 31, 2014, 57 pages.
Krecichwost et al., U.S. Appl. No. 14/448,630, filed Jul. 31, 2014, 57 pages.
Webpage printout titled "Infinite Scroll—Support—WordPress. com," Printed on May 12, 2014, 5 Pages.
Webpage printout titled "Home—teesoft, make software to a tee," Printed on Jun. 18, 2014, 6 Pages.
Chen et al., "Detecting Web Page Structure for Adaptive Viewing on Small Form Factor Devices," ACM, 2003, pp. 225-233.
Ivory et al., Preliminary Findings on Quantitative Measures for Distinguishing Highly Rated Information-Centric Web Pages, Google 2000, pp. 1-15.
Jang et al., "Signal Processing of the Accelerometer for Gesture Awareness on Handheld Devices," Proceedings of the 2003 IEEE International Workshop on Robot and Human Interactive Communication, 2003, pp. 139-144.
Nebeling et al., "Metrics for the Evaluation of News Site Content Layout in Large-Screen Contexts," ACM, 2011, pp. 1511-1520.
Non-Final Office Action mailed on Jun. 15, 2016, issued in connection with U.S. Appl. No. 14/448,597, filed Jul. 31, 2014, 23 pages.
Non-Final Office Action mailed on Jun. 15, 2016, issued in connection with U.S. Appl. No. 14/448,602, filed Jul. 31, 2014, 24 pages.
Non-Final Office Action mailed on Jun. 15, 2016, issued in connection with U.S. U.S. Appl. No. 14/448,604, filed Jul. 31, 2014, 23 pages.
Non-Final Office Action mailed on May 5, 2016, issued in connection with U.S. Appl. No. 14/448,610, filed Jul. 31, 2014, 22 pages.
Non-Final Office Action mailed on May 5, 2016, issued in connection with U.S. Appl. No. 14/448,613, filed Jul. 31, 2014, 14 pages.
Non-Final Office Action mailed on May 4, 2016, issued in connection with U.S. Appl. No. 14/448,616, filed Jul. 31, 2014, 15 pages.
Non-Final Office Action mailed on May 5, 2016, issued in connection with U.S. Appl. No. 14/448,621, filed Jul. 31, 2014, 13 pages.
Non-Final Office Action mailed on May 4, 2016, issued in connection with U.S. Appl. No. 14/448,630, filed Jul. 31, 2014, 12 pages.
Hung et al., "Implementation of a WAP-based Telemedicine System for Patient Monitoring," IEEE Transactions on Information Technology in Biomedicine, Jun. 2003, pp. 101-107, vol. 7, No. 2.
Öquist et al., "Eye Movement Study of Reading Text on a Mobile Phone Using Paging, Scrolling, Leading and RSVP," ACM, 2007, pp. 176-183.
Final Office Action mailed on Oct. 31, 2016, issued in connection with U.S. Appl. No. 14/448,610, filed Jul. 31, 2014, 20 pages.
Notice of Allowance mailed on Oct. 27, 2016, issued in connection with U.S. Appl. No. 14/448,613, filed Jul. 31, 2014, 5 pages.
Notice of Allowance mailed on Nov. 1, 2016, issued in connection with U.S. Appl. No. 14/448,616, filed Jul. 31, 2014, 5 pages.
Final Office Action mailed on Nov. 1, 2016, issued in connection with U.S. Appl. No. 14/448,621, filed Jul. 31, 2014, 15 pages.
Final Office Action mailed on Nov. 1, 2016, issued in connection with U.S. Appl. No. 14/448,630, filed Jul. 31, 2014, 16 pages.

* cited by examiner

ONLINE INFORMATION SYSTEM WITH SELECTABLE ITEMS FOR CONTINUOUS SCROLLING

CROSS-REFERENCE TO RELATED APPLICATIONS

This application claims priority to U.S. provisional patent application No. 61/988,097, filed May 2, 2014, and to U.S. provisional patent application No. 61/988,776, filed May 5, 2014, both of which are hereby incorporated by reference in their entirety.

BACKGROUND

Online information systems, such as web sites and other types of content servers, have slowly become an alternative to traditional print media. Today, many users access up-to-date news, articles, and other information via a web browser or application ("app") operating on a computing device. While these online information systems provide users with near-instantaneous access to a wealth of information, this information often lacks the formatting, organization, and presentation that users have grown accustomed to from traditional print media.

SUMMARY

In a first example embodiment, a first document may be requested and received from a server device. Based on the first document, a web page may be rendered for display on a client device. The rendered web page may include a plurality of selectable items, each corresponding to a respective type of web page content. Via a user interface of the client device, a selection of a first selectable item of the selectable items may be received. Possibly responsive to receiving the selection of the first selectable item, a second document may be requested and received from the server device. The second document may include a first particular type of web page content corresponding to the first selectable item. The web page may be re-rendered for display on the client device to include content from both the first document and the second document.

A second example embodiment may involve a non-transitory, computer-readable storage medium, having stored thereon program instructions that, upon execution by a computing device, cause the computing device to perform operations in accordance with the first example embodiment.

A third example embodiment may involve a computing device including at least a processor and data storage. The data storage may include program instructions that, when executed by the processor, cause the computing device to perform operations in accordance with the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Figure 1:
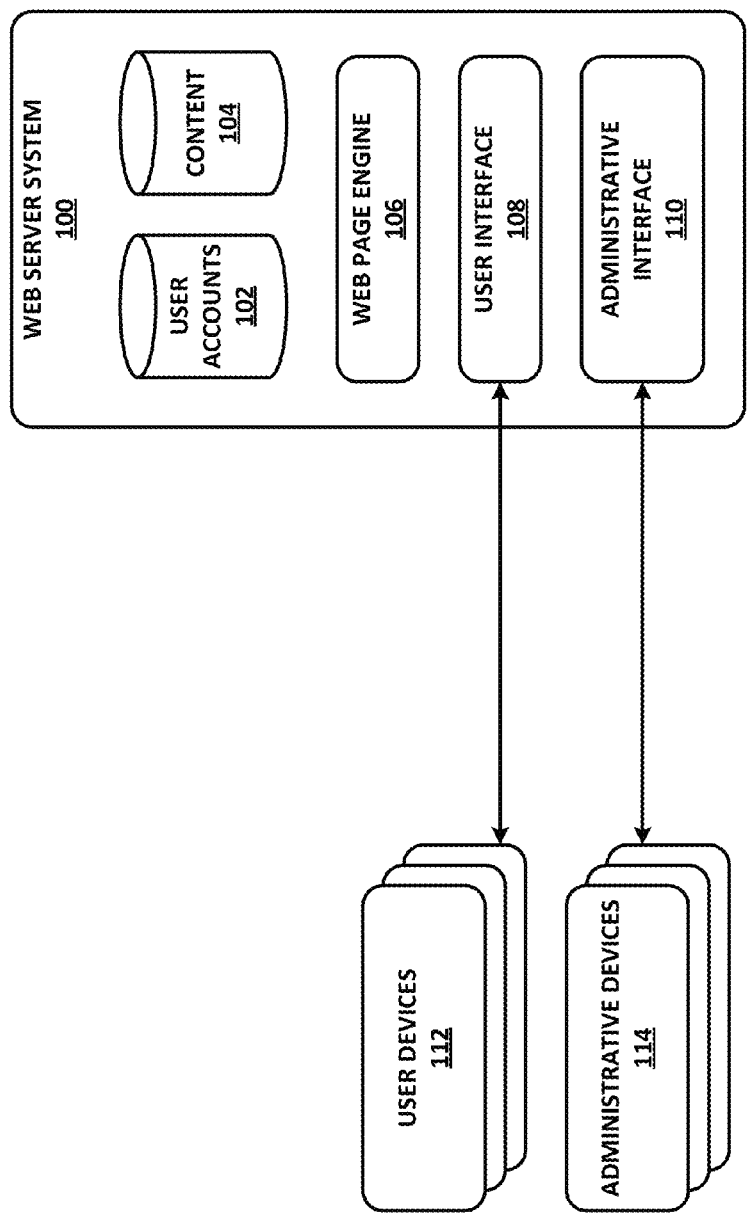
FIG. 1 is a depiction of an online information system, according to an example embodiment.

FIG. 1 is a depiction of a web server system 100, as well as its connectivity to other entities. Web server system 100 may be software that operates on one or more computing devices, such as client and/or server devices. In some embodiments, web server system 100 may be implemented as a "cloud-based" service on Internet servers, accessible via web pages, for example. Alternatively or additionally, web server system 100 may consist of client and/or server components.

Regardless, web server system 100 may include or have access to user accounts 102, content 104, web page engine 106, user interface 108, and administrative interface 110. In some embodiments, web server system 100 may include or have access to more or fewer elements, or these elements may be arranged differently.

User accounts 102 may be a database and/or some other organization of information that represents attributes of one or more users of web server system 100. Thus, for each user, user accounts 102 may include a username, email address, physical address, phone number, and/or billing information. User accounts 102 may also include representations of a user's subscription (if any) to web server information system 100. These representations may include the type of subscription, types of content 104 associated with the subscription that the user can access, the duration of the subscription, and so on. User accounts may additionally include representations of options and/or configuration data associated with the user. At least some of these options and/or configuration data may be set, updated, or modified by the user.

Content 104 may include raw or at least partially formatted content accessible to web server system 100. This content may include text, images, audio, video, and/or multimedia. Further, content 104 may be arranged in a logical fashion. For instance, text and images from a particular article may be associated with one another. Also, articles directed to a particular topic or subject may also be related to one another. In some cases, content 104 may be organized into a discrete number of categories, such as world news, national news, local news, sports, health, entertainment, technology, humor, and so on.

Web page engine 106 may be software arranged to render parts of content 104 into a web page for viewing by a user or administrator. For instance, web page engine 106 may be able to receive a request for information from one of user devices 112, retrieve the associated content from content 104, format the retrieved content in accordance with the user account of the user, and provide a representation of this data to the user device via user interface 108. The representation may take the form of one or more documents and related information that can be rendered, as a web page, on a user interface of the user device. Web page engine 106 may be able to perform other functions as well.

User interface 108 may be a representation of what a user sees when he or she accesses information via web server system 100. For instance, user interface 108 may take the form of one or more columns of information from content 104 that was formatted by web page engine 106. The information may be topically organized so that the user can logically browse through related articles. In some cases, the information may be organized in a scrolling interface that is configured to allow forward scrolling and backward scrolling. However, other implementations and user interface paradigms are possible. User interface 108 may also support a mode in which a user can view and/or edit his or her user account information and settings.

Administrative interface 110 may be a representation of what an administrator sees when he or she accesses web server system 100. Thus, administrative interface 110 may allow an administrator to upload, write, and/or edit articles or other content. Administrative interface 110 may present information regarding the configuration, status, and/or health of web server system 100.

Accordingly, web server system 100 may facilitate online access from one or more user devices 112 and/or administrative devices 114. Each of user devices 112 and/or administrative devices 114 may be a computing device, and these computing devices may be interconnected to web server system 100 by a computer network, such as the Internet or one or more private networks.

Each of user devices 112 may correspond to a human user of web server system 100. Each of administrative devices 114 may correspond to a human or automated entity that operates and/or provides content to web server system 100. For instance, administrative devices 114 may be associated with individuals or groups that update, maintain, and/or monitor the health of web server system 100. In some situations, administrative devices 114 may be owned or operated by entities that provide content to web server system 100. For instance, an administrative device may be operated by a newswriter who writes and/or edits articles that are eventually placed in content 104. Alternatively or additionally, an administrative device may represent a third party entity (e.g., a news feed) that provides articles for content 104.

Web server system 100, user devices 112 and/or administrative devices 114, as well as any other device or function associated with the architecture of FIG. 1, can represent, be operated on, or be operated by one or more computing devices. These computing devices may be organized in a standalone fashion, in networked computing environments, or in other arrangements. Examples are provided in the next section.

2. Example Computing Devices and Cloud-Based Computing Environments

Figure 2:
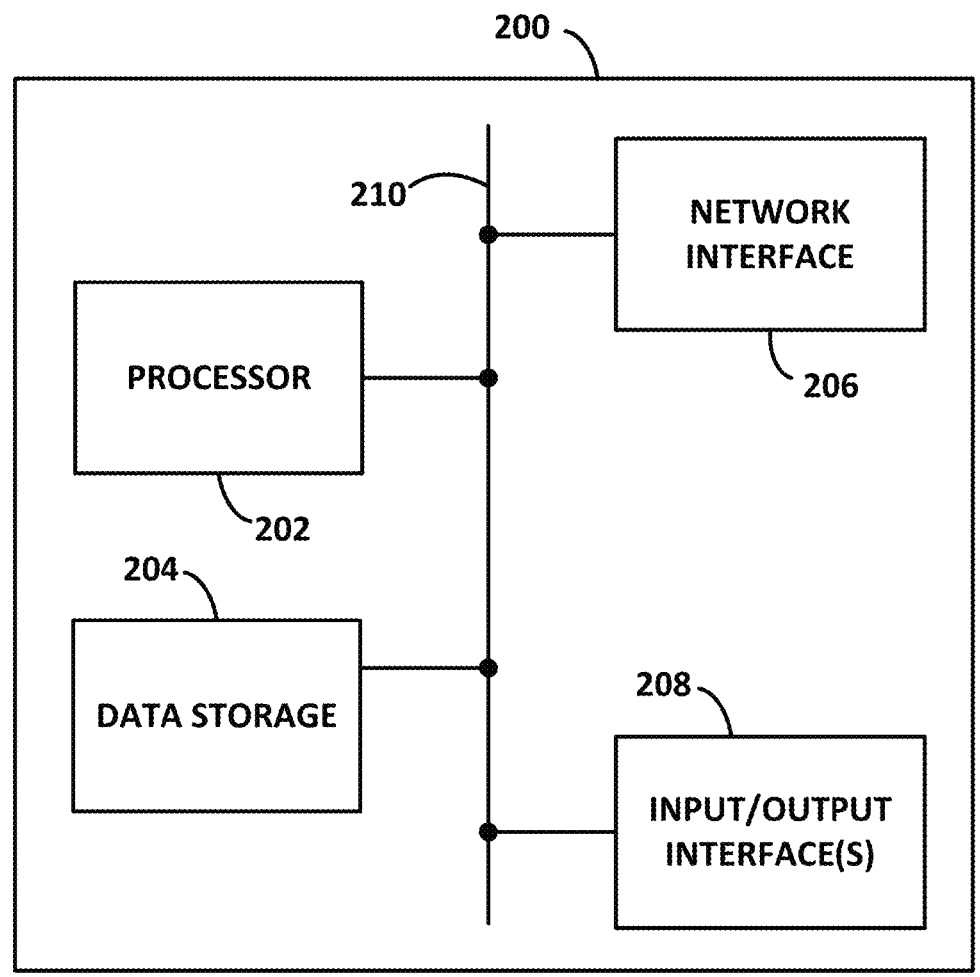
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a personal computer (PC), laptop, tablet, smartphone, server, or some other type of computational platform. For purposes of simplicity, this specification may equate computing device 200 to a client device from time to time. Nonetheless, it should be understood that the description of computing device 200 could apply to any component used for the purposes described herein.

In this example, computing device 200 includes a processor 202, a data storage 204, a network interface 206, and input/output interface(s) 208, all of which may be coupled by a system bus 210 or a similar mechanism. Processor 202 can include one or more central processing units (CPUs), such as one or more general purpose processors and/or one or more dedicated processors (e.g., application specific integrated circuits (ASICs), digital signal processors (DSPs), and/or network processors).

Data storage 204, in turn, may include volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may include program instructions, perhaps stored on a non-transitory, computer-readable medium, executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may include multiple physical interfaces.

Input/output interface(s) 208 may facilitate user interaction with example computing device 200. Input/output interface(s) 208 may include multiple types of input devices, such as a keyboard, a mouse, a touch screen, and so on. Similarly, input/output interface(s) 208 may include multiple types of output devices, such as a screen, monitor, printer, or one or more light emitting diodes (LEDs). Additionally or alternatively, computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various local or remote locations.

Figure 3:
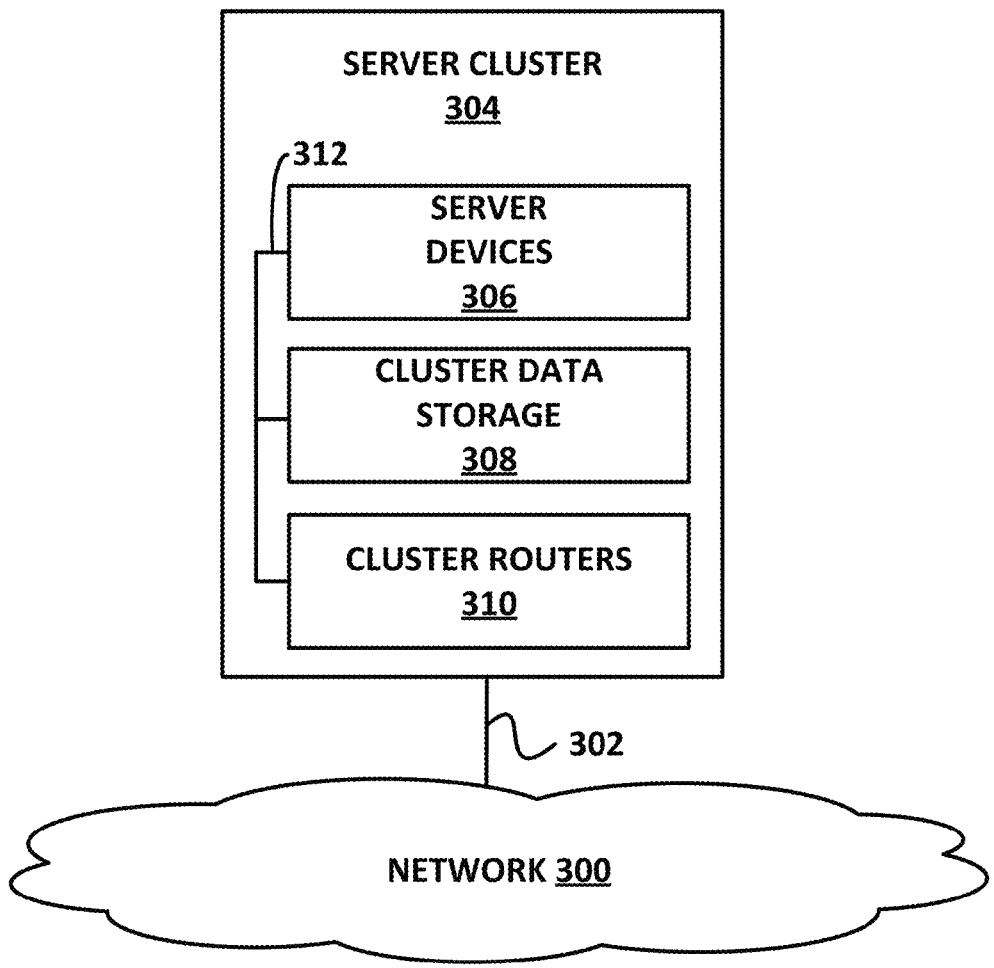
FIG. 3 illustrates a schematic drawing of a networked server cluster, according to an example embodiment.

FIG. 3 depicts a cloud-based server cluster 304 in accordance with an example embodiment. In FIG. 3, functions of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

In some embodiments, web server system 100 may operate on a server cluster such as cloud-based server cluster 304, while user devices 112 and administrative devices 114 may operate on smaller scale computing devices such as computing device 200. However, other arrangements are possible.

3. Example Web Server and Web Browser Functions a. Web Communication Protocols and Markup Languages

A web page may represent any type of electronic document, file, or information that is suitable for distribution from a web server and to a web browser. In order to facilitate this distribution, web browsers and web servers may use the hypertext transfer protocol (HTTP). HTTP may be implemented as an application-layer request-response protocol. A web browser, for example, may submit one or more HTTP request messages to a web server. The web server may return one or more response messages to the web browser. The response message(s) may include content such as text, images, multimedia, style sheets, scripts, and so on. The web browser may render the web page on an output modality of a computing device. The web browser may also output associated information such as a uniform resource locator (URL) that serves as an address of the currently-viewed web page.

The rendering of a web page may involve the web browser formatting and displaying the content of the response message(s), possibly in accordance with a markup language. For instance, a web page may be represented in the form of the hypertext markup language (HTML). An HTML document, for example, may include paired or unpaired tags that delimit elements of the document's content. Tags may allow a text element to be interpreted and displayed by the web browser according to a pre-established or dynamic schema. Tags may also allow images and other objects to be embedded within a text element of a web page. Further, tags may include links (hyperlinks) to other web pages on the same web server or a different web server. Some tags include attributes, possibly in the form of name-value pairs that further identify, classify, or indicate how the web browser should display or process the element.

Figure 4:
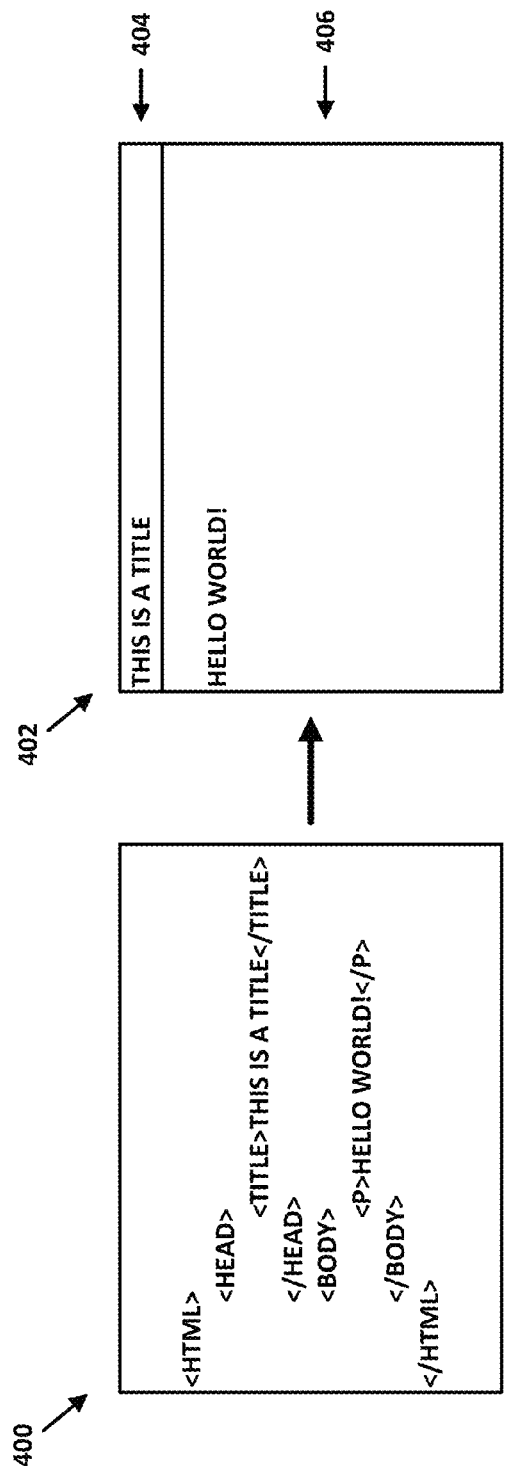
FIG. 4 is a depiction of a markup language document and an associated rendering of the markup language document, according to an example embodiment.

FIG. 4 provides an example of an HTML document, and how that document might be formatted and displayed on a web browser. HTML document 400 includes five elements, delimited by pairs of tags. The element between the <html> and </html> tags describes the web page. The element between the <head> and </head> tags defines optional header information associated with the web page. For instance, as part of this header information, the element between the <title> and </title> tags defines the title of the web page. The element between the <body> and </body> tags describes the content of the web page. As part of this content, the element between the <p> and </p> tags describes a paragraph of text to be displayed on the web page.

Web page 402 is an illustration of how a web browser could format and display HTML document 400. The top section 404 of web page 402 represents the title bar widget of the web browser. The bottom section 406 of web page 402 represents the displayed content of the web browser. In web page 402, the element between the <title> and </title> tags of HTML document 400 is displayed in top section 404 and the element between the <p> and </p> tags of HTML document 400 is displayed in bottom section 406. Web page 402, however, is just an example, and HTML document 400 could be formatted and displayed in different ways. Further, any of the discussion herein regarding HTML document 400 could also be applied to any other type of markup language document or web page encoding. Further, the markup language document or web page encoding may include one or more scripts that may be executed by the client device that operates the web browser.

b. Document Object Models

Some web browsers and web servers support common conventions for their internal representations of web pages. For instance, many web browsers and web servers support the document object model (DOM). The DOM is a generic mechanism for representing and interacting with elements of a markup language. The DOM may represent an HTML document as a tree, with each HTML element as a node of the tree. With this common representation, scripts can be embedded within web pages that can traverse this tree to dynamically read, modify, write, or create HTML elements within the HTML document. These scripts may also react to events occurring in the web browser, such as pointer events. Pointer events may include, for instance, mouse-over events in which a user's mouse pointer hovers over an HTML element or mouse-click events in which the user presses and/or releases a mouse button on or in the vicinity of an HTML element. In this way, the display of the web page can be modified based on the user's interaction with HTML elements within the web page.

Figure 5:
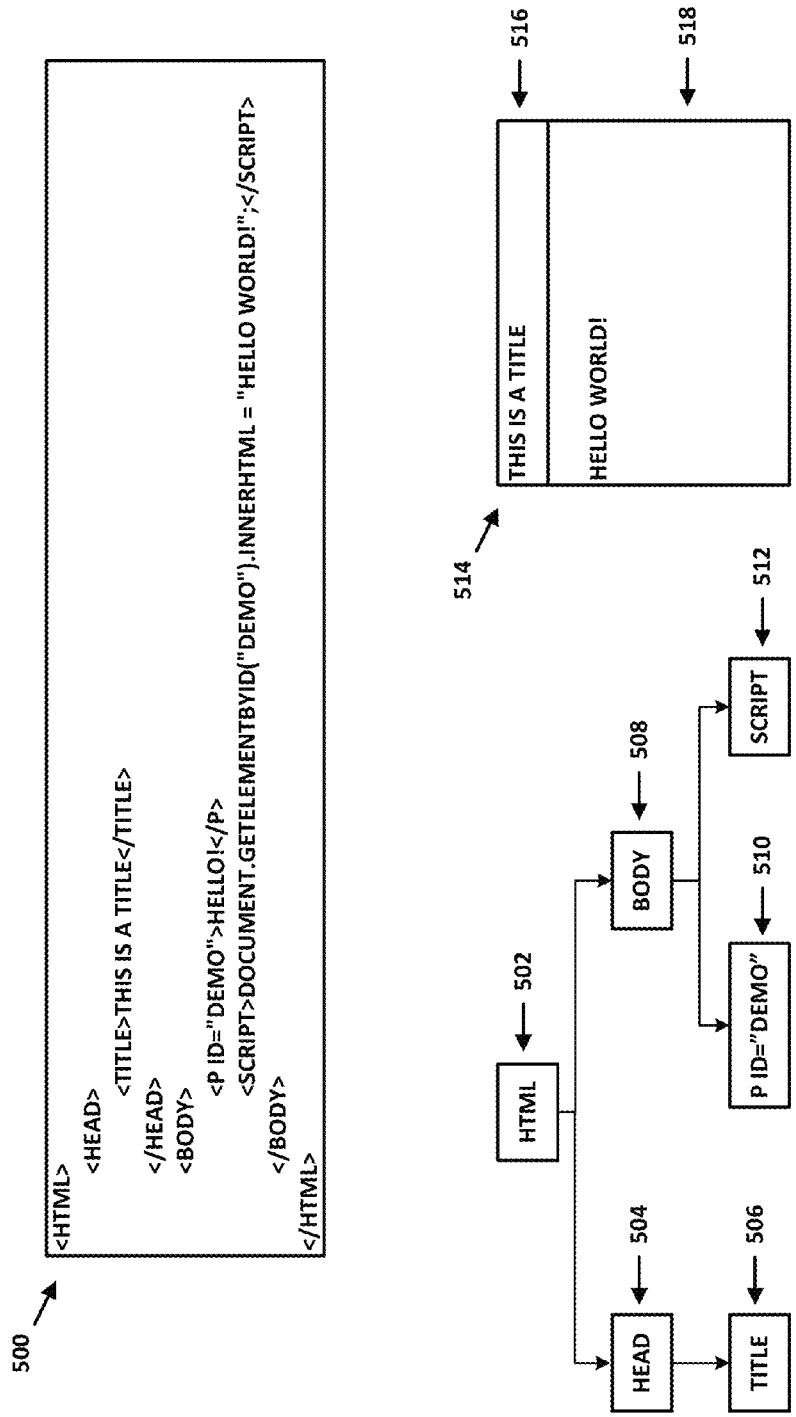
FIG. 5 is a depiction of a markup language document, a tree representing aspects of the markup language document, and an associated rendering of the markup language document, according to an example embodiment.

As an example, FIG. 5 depicts an example HTML document 500. Example HTML document 500 is similar to example HTML document 400, except that HTML document 500 includes a pair of <p> tags that include a name-value pair of id="demo". Additionally, HTML document 500 also includes a pair of <script> tags that include the script command "document.getElementById("demo").innerHTML="Hello World!";". While FIG. 5 depicts an example script using the JavaScript language, other scripting languages may be used for the same purpose.

A DOM tree for HTML document 500 is shown as well. Root node 502 represents the element of HTML document 500 between the <html> and </html> tags. Node 504 represents the element between the <head> and </head> tags. Node 506 represents the element between the <title> and </title> tags. The text "This is a title" may be represented in a node (not shown) which may be a child of node 506.

Node 508 represents the element between the <body> and </body> tags. Node 510 represents the element between the <p id="demo"> and </p> tags. The text "Hello!" may be represented in a node (not shown) which may be a child of node 508. Node 512 represents the element between the <script> and </script> tags. The text "document.getElementById("demo").innerHTML="Hello World!";" may be represented in a node (not shown) which may be a child of node 512.

The script command may, among other possible features, search the DOM tree for an element with an "id" field with the value "demo". After finding this element, the script may replace text included within that element with the text "Hello World!" The operation of the script may occur entirely on the client device, or may occur in conjunction with a server device that operates the web server.

An example result of the operation of this script is shown in web page 514. Web page 514 is an illustration of how a web browser could format and display HTML document 500. The top section 516 of web page 514 represents the title bar widget of the web browser. The bottom section 518 of web page 514 represents the displayed content of the web browser. Due to the operation of the script, the text "Hello!" appearing between the <p id="demo"> and </p> tags may be replaced with the text "Hello World!"

The example in FIG. 5 illustrates just one way in which a script can modify the HTML elements of a web page. Scripts can perform additional operations on HTML elements, and may be able to carry out additional functions related to web browser configuration and state.

4. Example Web Pane Scrolling and Navigation Features a. Intra-Web-Page Scrolling

Figure 6:
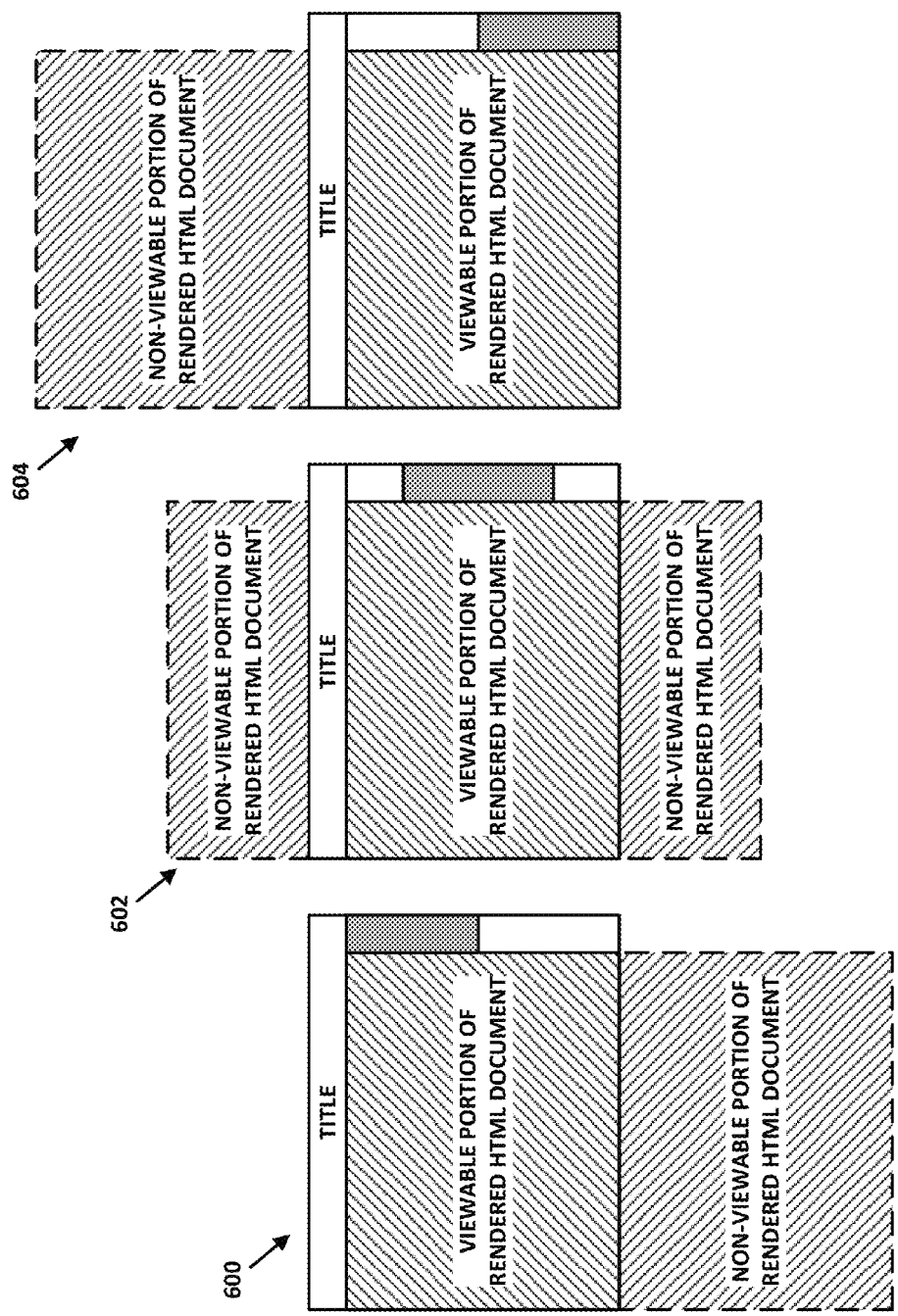
FIG. 6 is a depiction of web page navigation via scrolling, according to an example embodiment.

FIG. 6 depicts three states, 600, 602, and 604, of a web browser displaying a portion of a web page via a scrollable user interface. In each state, the web browser displays part of a rendered HTML document. The web browser includes a title bar on top of its user interface, and a scroll bar on the right of its user interface. The scroll bar is a long rectangular area with a shaded section (which also may be referred to as a scroll box or elevator) having a position that corresponds to the viewable portion of the rendered HTML document.

The vertical length of the rendered HTML document exceeds the vertical length of the web browser. Thus, the rendered HTML document includes a viewable portion, which is displayed in the web browser, as well as a non-viewable portion, that is not displayed in the web browser. Therefore, the web browser displays only a portion of the rendered HTML document at a time.

For instance, in state 600, a top portion of the rendered HTML document is viewable, and a bottom portion is not viewable. In state 602, a middle portion of the rendered HTML document is viewable, while top and bottom portions are not viewable. In state 604, a bottom portion of the rendered HTML document is viewable, and a top portion is not viewable.

It should be understood that the depictions of non-viewable portions of documents herein are merely logical representations of this information that are presented for purposes of illustration. In the embodiments herein, the user may be able to see what is viewable in the web browser, and may be able to scroll forward or backward to see the non-viewable portions of the documents. Further, these depictions do not imply any particular arrangements in memory of these documents or data representing these documents.

The scroll box can be moved to allow parts of the non-viewable portion(s) of the rendered HTML document to become viewable. For instance, if the scroll box is dragged down, the rendered HTML document may appear to scroll down in the web browser. Conversely, if the scroll box is dragged up, the rendered HTML document may appear to scroll up in the web browser. The ratio of the length of the scroll box to the total length of the scroll bar may be proportional to ratio of the vertical size of the viewable portion of the rendered HTML document to the vertical size of the entire rendered HTML document.

Thus, if the user begins with state 600 and moves the scroll box down to the middle of the scroll bar, the web browser may display the web page in accordance with state 602. If the user moves the scroll box down to the bottom of the scroll bar, the web browser may display the web page in accordance with state 604. The user may use the scroll box (or some other mechanism, such as a mouse wheel or a touchscreen interface), to scroll up and down through the rendered HTML document.

In some embodiments, the web browser, perhaps via markup language and/or scripts on the web pages, may maintain a correct scroll box position relative to the scroll bar, even as the web browser window height, width, or orientation changes (e.g., landscape to portrait mode or vice-versa). The correct position of the scroll box may also be maintained even as a web page dynamically changes (e.g., when content is added to or removed from the web page). This may involve dynamically recalculating the size of one or more dimensions of the viewable portion of a web page, the total size of one or more dimensions of the web page, and determining the position of the scroll box in the scroll bar based on the location of the viewable portion of the rendered HTML document within the total size of the rendered HTML document.

As an alternative to scrolling vertically, horizontal scrolling, diagonal scrolling, or some other directionality of scrolling may be used. Throughout the description herein, the concept of "scrolling forward" may be used to refer to scrolling generally away from the beginning of a document and toward the end of the document. Likewise, the concept of "scrolling backward" may be used to refer to scrolling generally away from the end of a document and toward the beginning of the document. These terms may be used regardless of whether the scrolling is implemented vertically, horizontally, or otherwise.

b. Inter-Web-Page Navigation

Figure 7:
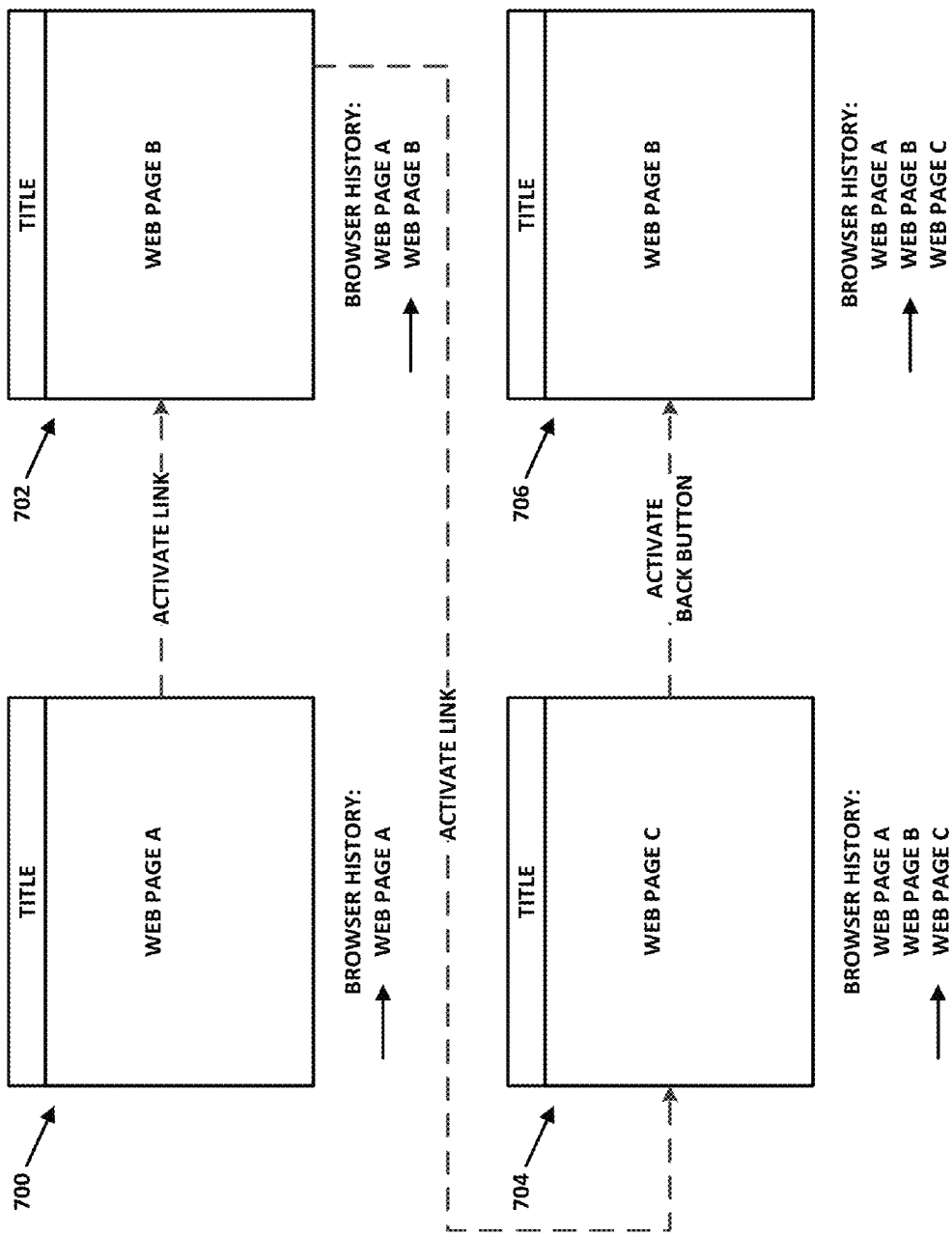
FIG. 7 is a depiction of web page navigation via browsing, according to an example embodiment.

As described above, FIG. 6 provides an example of intra-page navigation via scrolling. In contrast, FIG. 7 provides an example of inter-page navigation via browsing. States 700, 702, 704, and 706 depict web browser states as a user navigates to web page A, to web page B, to web page C, and then back to web page B, respectively. For sake of simplicity, it is assumed that each of these web pages A, B, C, and D can be fully depicted within the web browser.

Associated with a state of the web browser is a browser history. The browser history may be implemented as an ordered list or a tree of web pages that the user has viewed in the web browser's current session. State 700 depicts a web browser displaying web page A. In the browser history, only "web page A" is listed, indicating that web page A is the only page that the browser has displayed. The arrow to the left of "web page A" in the browser history indicates that web page A is the currently displayed web page.

Perhaps after viewing web page A for some period of time, the user may activate (e.g., click on or touch) a link embedded within web page A and navigate to web page B. As a result, at state 702 the web browser displays web page B. In the associated browser history, "web page A" and "web page B" are listed. The arrow to the left of "web page B" in the browser history indicates that web page B is the currently displayed web page.

Perhaps after viewing web page B for some period of time, the user may activate a link embedded within web page B and navigate to web page C. As a result, at state 704 the web browser displays web page C. In the associated browser history, "web page A," "web page B," and "web page C" are listed. The arrow to the left of "web page C" in the browser history indicates that web page C is the currently displayed web page.

The web browser may include "back" and "forward" buttons (not shown) that facilitate navigation based on the browser history. Activating the back button may cause the web browser to display the previous web page in the browser history. Activating the forward button may cause the web browser to display the next web page in the browser history.

Thus, at state 704, if the user activates the back button, the web browser may display web page B. For instance, from the browser history, the web browser may determine that the currently viewed web page is web page C. The web browser may then move back one unit in the browser history to find that web page B was the previously-displayed web page. Then, the web browser may display web page B once again.

As a result, at state 706 the web browser displays web page B after the user activates the back button. In the associated browser history, "web page A," "web page B," and "web page C" are listed. The arrow to the left of "web page B" in the browser history indicates that web page B is the currently displayed web page. Thus, activating the back button again may result in the web browser displaying web page A. However, activating the forward button may result in the web browser displaying web page C.

c. Web Page Navigation with Continuous Scrolling

In some embodiments, the features of FIGS. 6 and 7 may be combined to some extent. In doing so, the navigation of web pages may more closely resemble that of a physical newspaper or magazine.

For instance, a newspaper or magazine may be arranged into several sections, such as world news, national news, local news, sports, health, entertainment, technology, humor, and so on. Each section may include information related to the topic of that section. Typically, a reader will read or browse in one section before moving to the next section. Further, the reader may prefer to read the sections in a particular order, and may choose not to read certain sections.

Figure 8A:
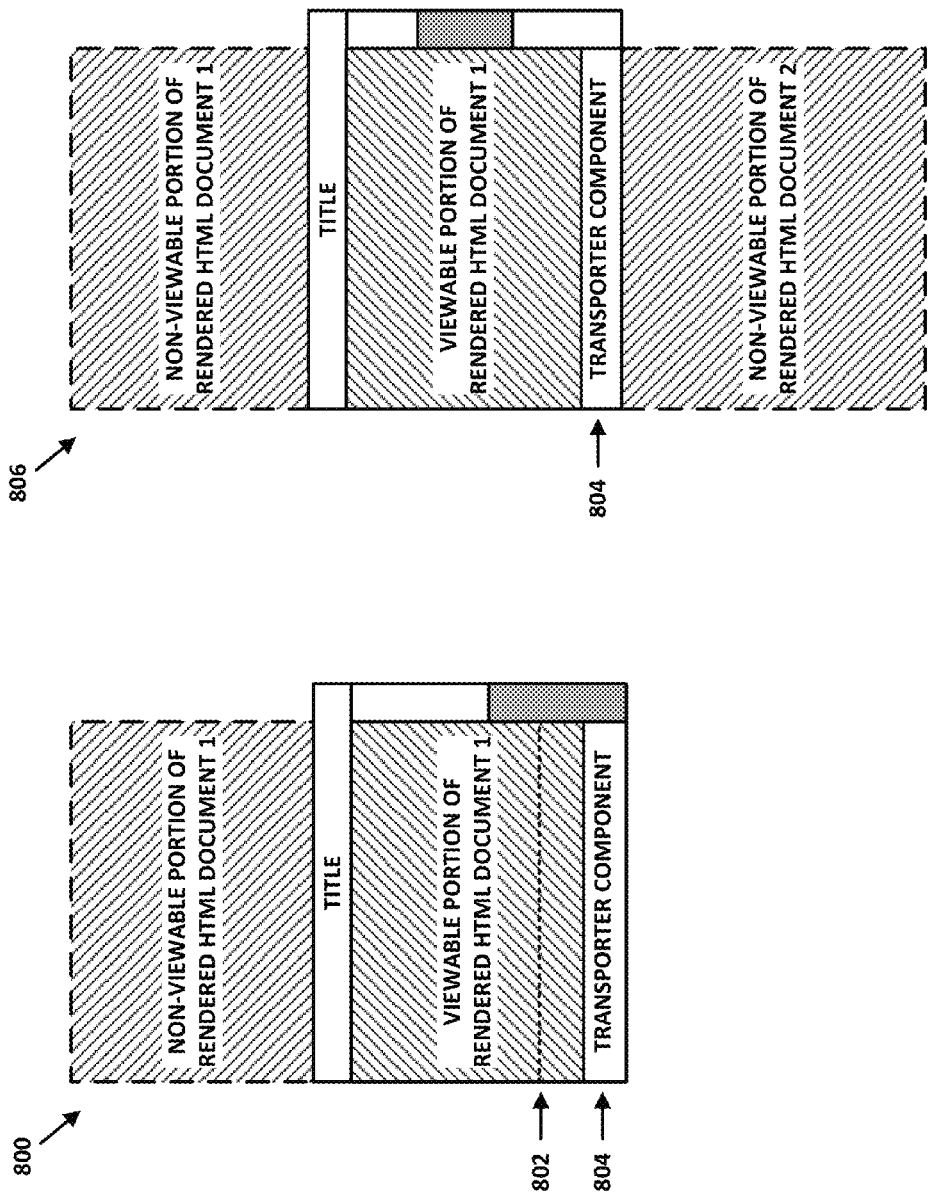
FIG. 8A is another depiction of web page navigation via scrolling, according to an example embodiment.

FIG. 8A is a depiction of web page navigation that facilitates a newspaper-like user experience. Similar to FIG. 6, the user may be presented with a representation of rendered HTML document 1 ("document 1") in a web browser. Thus, the user may be able to conduct intra-page navigation by scrolling forward and/or backward. In state 800, for instance, a bottom portion of document 1 is viewable, and a top portion is not viewable.

Additionally, transporter component 804 may appear at the bottom of the document 1. Described in more detail in the discussion of FIG. 9, transporter component 804 may include one or more selectable items. These selectable items correspond to other sections or sub-sections of the same web page below where the user is currently browsing, or links to other sections, or sub-sections, or web pages. In some embodiments, the selectable items may be depicted as images or other media. These sections and sub-sections may relate to various parts of a newspaper or magazine.

Further, above transporter component 804 may be a demarcation marker 802 represented by a dotted line. Demarcation marker 802 might not appear visually in the web browser, but may instead represent a marker beyond which further forward scrolling may cause a new HTML document to be pre-loaded below document 1. For instance, when demarcation marker 802 is below the current viewable portion of the document and the user scrolls forward so that demarcation marker 802 enters the viewable portion of document 1, this may trigger the pre-loading of another HTML document.

Demarcation marker 802 may be, for example, 1000 pixels above the bottom of document 1. Alternatively, demarcation marker 802 may be anywhere from 500 pixels to 1500 pixels above the bottom of document 1. In some cases, a demarcation marker may be some other number of pixels from the bottom of a rendered HTML document.

The new HTML document may represent another logical section or sub-section of the web site. For instance, keeping with the newspaper analogy, the web site's content may be divided into sections and/or sub-sections including world news, national news, local news, sports, health, entertainment, technology, humor, and so on. The new section or sub-section may be selected, for example, from one of these categories based on user preference and/or some pre-established ordering of the sections and/or sub-sections. Alternatively, the new section or sub-section may be based on a selected selectable item of a transporter component.

Particularly, this new HTML document, depicted in state 806 as rendered HTML document 2 ("document 2"), may be requested from the web server by the web browser. After receiving at least a part of the new HTML document, the web browser may render this document, and then place it in front of document 1 (i.e., in the forward scrolling direction). Thus, for example, in state 806, document 2 is placed below document 1 such that the bottom of document 1 is adjacent to the top of document 2. As part of this process, the content of document 2 may be added to the DOM that exists for document 1. Thus, the DOM for any given web page may dynamically change and be re-calculated based on a user's scrolling activity.

From the user's perspective, the pre-loading and placement of the new HTML document may occur automatically and/or transparently. Thus, document 1 and document 2 may appear to the user as one contiguously rendered HTML document. For instance, the scroll box in state 806 may be automatically re-positioned and/or re-sized to indicate the position of the viewable portion of these documents relative to the entirety of the documents. Also, the user might not notice a delay associated with the retrieval and rendering of document 2.

Figure 8B:
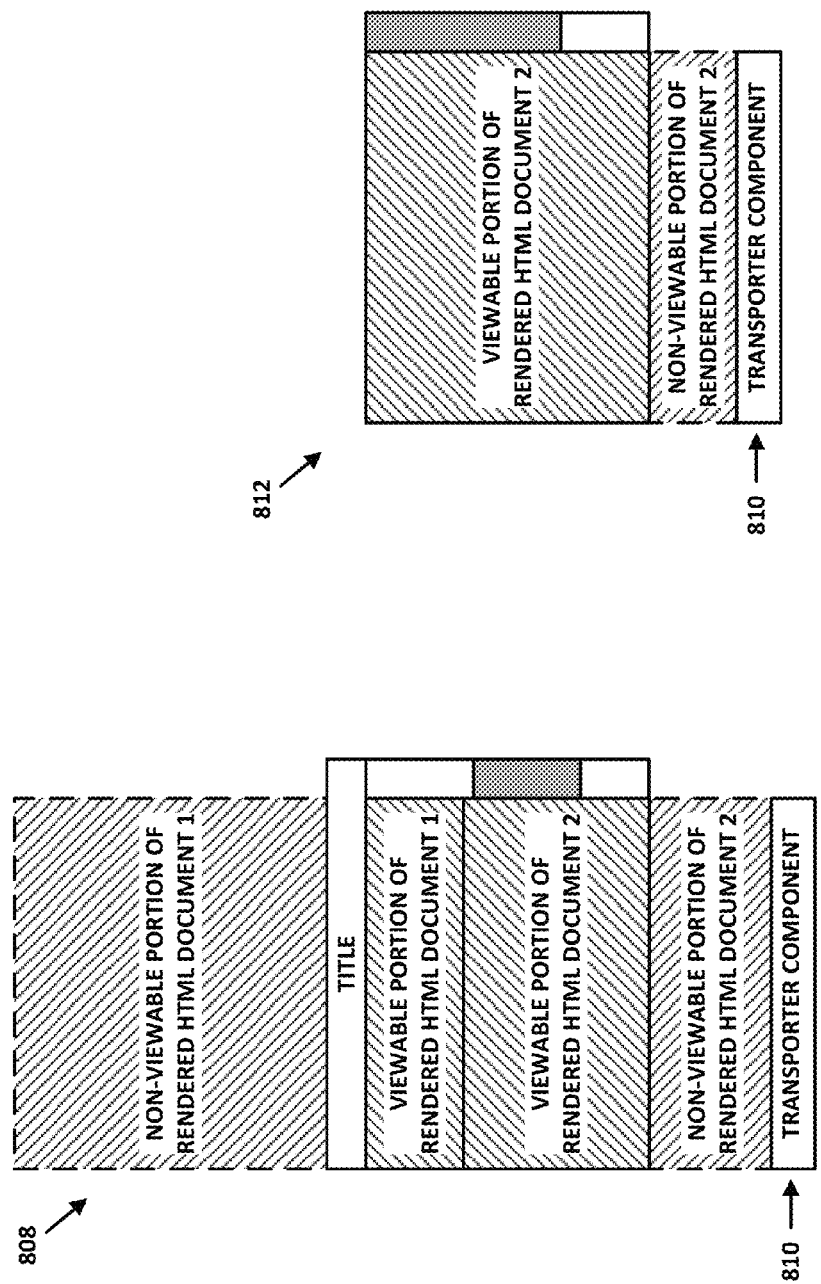
FIG. 8B is another depiction of web page navigation via scrolling, according to an example embodiment.

If the user continues to scroll forward (which is in the down direction in FIG. 8A), the user may view part or all of document 2. Turning to FIG. 8B, state 808 depicts the user having scrolled forward from state 806. Thus, the web browser displays a viewable portion of document 1, as well as a viewable portion of document 2. The viewable portion of document 1 may include transporter component 804 (not shown). In the backward scrolling direction is a non-viewable portion of document 1, and in the forward scrolling direction is a non-viewable portion of document 2.

The non-viewable portion of document 2 may include transporter component 810, which may, in turn, include the same information as transporter component 804, or may include at least some different information. For instance, transporter component 810 may include some of the same selectable items as transporter component 804, but may also include other selectable items or other content as well. Thus, different transporter components may be related to different sets of sections or sub-sections of content.

State 812 depicts the user having scrolled forward from state 808 such that document 1 is no longer viewable. Doing so may trigger the web browser to discard or remove its representation(s) of document 1 from the web page, as shown in state 812. One reason for doing so is to reduce the memory and other resource utilization of the web browser or application displaying the web page. This way, the web browser or application is more likely to remain responsive and stable, and less likely to slow down or exhibit a fault (e.g., a crash).

Thus, as depicted in state 812, the web page includes document 2 but not document 1, and the top portion of document 2 is viewable, whereas the bottom portion is not. Further, the scroll box now appears at the top of the scroll bar, indicating that the viewable portion is the top of document 2. Alternatively, scrolling to the bottom of document 2, or beyond a demarcation marker in document 2 may result in the web browser discarding its representation(s) of HTML document 1 from memory. As part of this process, the content of HTML document 1 may be removed from the DOM. This is another way in which the DOM may dynamically change based on the user's scrolling activity.

The forward scrolling behavior of the web browser, as illustrated in states 806 and 808, may be used for backward scrolling as well. Thus, for instance, if the user scrolls backward (e.g., the user scrolls up) from state 812, document 1 may be pre-loaded and displayed in the backward scrolling direction (e.g., above) document 2. In this way, continuous scrolling in both the forward and backward directions may be implemented. Similar to scrolling in the forward direction, scrolling in the backward direction may involve pre-loading an HTML document, in this case for displaying behind (e.g., above) the currently displayed HTML document. Further, a demarcation marker at which to begin pre-loading a new HTML document may exist for scrolling in the backward direction as well. Thus, for instance, after a user scrolls backward past the demarcation marker, the previous document may be pre-loaded and/or displayed. The demarcation marker may be a threshold number of pixels (e.g., 500, 1000, or 1500) from the top of the displayed HTML document.

d. Automatic Changes to Browser History and Displayed URL

The continuous scrolling feature illustrated in FIGS. 8A and 8B may include making automatic changes to the web browser's browsing history, despite the user not activating a link or the web browser's back or forward buttons. For instance, as part of the transition from state 806 to state 808, document 1 may be placed in the web browser's browser history as the most recently-viewed document, and document 2 may be made to be the current document.

Furthermore, document 1 and document 2 may each be associated with a different URL. Perhaps as part of the transition from state 806 to state 808, the current URL (which may be displayed by the web browser) may change from that of document 1 to that of document 2.

This browser history and URL adjustment may occur automatically and/or in response to scrolling activity by the user in connection with of one or more HTML documents. Further, one or more scripts that are embedded within or associated with these HTML documents may carry out the adjustments. For example, the DOM used by the web browser may include one or more application programming interface (API) calls that allow entries in the browser history to be added, edited, or deleted. The DOM may also include one or more API calls that allow the current URL displayed by the web browser to be changed. Thus, via the DOM, a script may be able to control the web browser's browser history and/or displayed URL. Alternatively or additionally, the DOM and perhaps the web browser's browser history as well, may be modified by API functions specific to a particular type of web browser.

In at least some embodiments, there may be several demarcation markers (e.g., thresholds). For instance, when a first document is displayed as the web page and the user scrolls forward past the first demarcation marker, a second document may be pre-loaded and added to the web page after the first document. Then, if the user scrolls past a second demarcation marker, the displayed URL may be changed from that of the first document to that of the second document, and the first document's URL may be added to the browser's history. Then, if the user scrolls past a third demarcation marker, the first document may be removed from the displayed web page. Then, if the user scrolls past a fourth demarcation marker, a third document may be pre-loaded and added to the web page after the second document.

The first, second, third, and fourth demarcation markers may follow one another in either the forward or reverse scrolling directions. For instance, the second demarcation marker may follow the first demarcation marker, the third demarcation marker may follow the second demarcation marker, and the fourth demarcation marker may follow the third demarcation marker in the forward scrolling direction or the reverse scrolling direction.

e. Transporter Component Display and Operation

Figure 9:
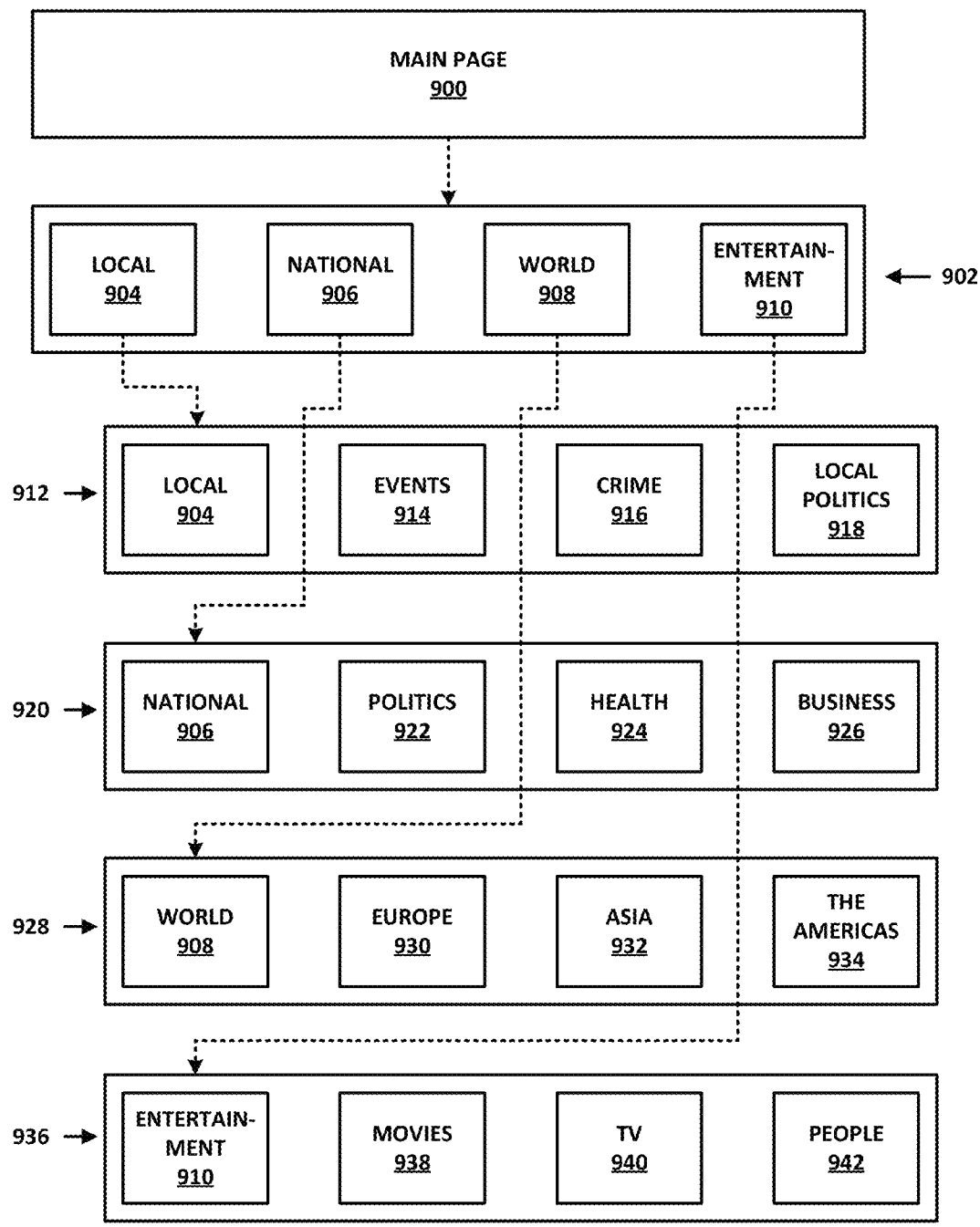
FIG. 9 is a depiction of a transporter component, according to an example embodiment.

FIG. 9 depicts example transporter components. As noted above, a transporter component may include one or more selectable items related to other sections and/or sub-sections of the same web page that the user is currently browsing, or selectable items related to other web pages. Each of these selectable items may be associated with one or more hyperlinks, text objects, image objects, multimedia objects, etc. FIG. 9 displays one possible transporter component arrangement, though other arrangements are possible.

For purposes of simplicity, each of the selectable items within a transporter component may be referred to in relation to a "section" of the web site. However, any of these selectable items may alternatively relate to sub-sections within a section of the web site, sub-sub-sections within a sub-section of the web site, and so on. Therefore, use of the term "section" herein may refer to a variety of logical arrangements of information.

Transporter component 902 may appear at the bottom of main page 900 of a web site. Alternatively, transporter component 902 may appear in some other location on a web page and/or in some other orientation. Transporter component 902 includes, as an example, four selectable items related to different sections of the web site. For instance, assuming that the web site includes news, main page 900 may include headlines, current stories, or other items of general interest. Transporter component 902 may allow the user to navigate to a local news section via local 904, a national news section via national 906, a world news section via world 908, and an entertainment news section via entertainment 910. Each of local 904, national 906, world 908, and entertainment 910 may include a hyperlink to their respective associated sections, as well as an image representing these sections, for example.

When the web browser is displaying the local news, national news, world news or entertainment news section, transporter component 902 may once again be displayed at the bottom of the web page. Alternatively, sub-sections of the displayed section may be represented in a different transporter component.

As an example, when the web browser is displaying the local news section, transporter component 912 may also be displayed. Transporter component 912 may allow the user to navigate within the local news section via local 904, an events section via events 914, a crime section via crime 916, and a local politics section via local politics 918. Each of local 904, events 914, crime 916, and local politics 918 may include a hyperlink to their respective associated sections, as well as an image representing these sections.

Similarly, when the web browser is displaying the national news section, transporter component 920 may also be displayed. Transporter component 920 may allow the user to navigate within the national news section via national 906, a politics section via politics 922, a health section via health 924, and a business section via business 926. Each of national 906, politics 922, health 924, and business 926 may include a hyperlink to their respective associated sections, as well as an image representing these sections.

Additionally, when the web browser is displaying the world news section, transporter component 928 may also be displayed. Transporter component 928 may allow the user to navigate within the world news section via world 908, a Europe section via Europe 930, an Asia section via Asia 932, and an Americas section via The Americas 934. Each of world 908, Europe 930, Asia 932, and The Americas 934 may include a hyperlink to their respective associated sections, as well as an image representing these sections.

Also, when the web browser is displaying the entertainment news section, transporter component 936 may be displayed. Transporter component 936 may allow the user to navigate within the entertainment news section via entertainment 910, a movies section via movies 938, a TV section via TV 940, and a people section via people 942. Each of entertainment 910, movies 938, TV 940, and people 942 may include a hyperlink to their respective associated sections, as well as an image representing these sections.

These transporter components may interact with the continuous scrolling feature described above. In some embodiments, continuous scrolling may occur across web pages referred to in each transporter component. For instance, the continuous scrolling feature may make content from local 904, national 906, world 908, and entertainment 910 appear as one continuous web page, perhaps via a combination of pre-loading, browser history rewriting, URL rewriting, and/or other features.

Alternatively or additionally, the continuous scrolling feature may make local 904, events 914, crime 916, and local politics 918 appear as if they were one continuous web page. For instance, when the user scrolls close to the end of the events 914 section, the web browser may pre-load the crime 916 section, when the user scrolls close to the end of the crime 916 section, the web browser may pre-load the local politics 918 section, and so on. Scrolling in the backward direction may result in similar previously-viewed sections being pre-loaded.

The continuous scrolling feature may do likewise for the national 906, politics 922, health 924, and business 926 sections, the world 908, Europe 930, Asia 932, and The Americas 934 sections, and the entertainment 910, movies 938, TV 940, and people 942 sections.

In some implementations, the continuous scrolling feature may operate across different transporter components. For example, if the user scrolls to the end of the last section in one transporter component (e.g., local politics 918), the continuous scrolling feature may then display the first section of another transporter component (e.g., national 906).

Further, the user may be able to customize one or more transporter components. Thus, the user may be able to indicate which sections that he or she is interested in viewing, and possibly the order in which he or she would like to view these items. In some cases, the user may be able to define a hierarchy of sections, sub-sections, sub-sub-sections, and so on, perhaps based on the general depiction of FIG. 9. Thus, any type of linear, circular, or tree-like relationship between sections may be established by the web site and/or by the user, and the relationship may be implemented by the continuous scrolling feature.

f. Advertisement Support

Web sites may include various types of advertisements ("ads"). These ads may take various forms and shapes, and may appear in various positions on a web page. For example, ads may appear as horizontal banners, vertical columns, and/or arbitrarily-sized rectangles or other shapes. Other types of ads may include pop-up ads (that cause a new window of the web browser to appear on top of the web site window), pop-under ads (that cause a new window of the web browser to appear under the web site window), or floating ads (that temporarily appear over content of the web site). Additional types of ads, with various placements and characteristics, are also possible.

Regardless of ad type, the content of an ad may be determined, at least in part, by the identity of the user viewing the ad, and/or the content of the web page this user is viewing. The identity of the user may be determined, for example, by an account through which the user logs into the web site. As the user browses across various web pages, each may display a different context-sensitive ad.

For instance, turning back to FIG. 8A, the user may be viewing document 1 in state 800. Document 1 may include, for example local news for a particular city. Document 1 may also present one or more ads to the user, and these ads may be based on the content of document 1. These ads may be for businesses located in the city, services that are provided in the city, and/or may relate to the content of the local news displayed in state 800. As an example, if the local news includes information about how the city's unemployment level is dropping, the ads may include content from staffing agencies that help businesses find new employees.

If the user scrolls forward and document 2 is loaded and rendered, a different ad may be displayed. Turning to FIG. 8B, in states 808 and 812 the user may view document 2, which may include, for instance, national news. Document 2 may also present one or more ads to the user based on the content of document 2. These ads may be for nation-wide businesses, nation-wide services, and/or may relate to the content of the national news displayed in state 808 or 812. As an example, if the national news includes information about an upcoming presidential election, the ads may include content from one or more presidential candidates seeking to obtain the user's vote in the election.

Web pages associated with each section of a transporter component may display different types of ads to the user based on the content of the web pages. The user's age, gender, marital status, purchasing history, political leanings, or other demographic information may also influence the type of ad displayed on each web page. Therefore, even though the continuous scrolling feature may make any number of web pages seem like one contiguous web page, multiple ads with varying content may be displayed therein.

In some implementations, some or all web pages may share or include a statically-positioned ad placeholder that stays in the same general location of the user's web browser, even if the user scrolls forward or backward. This ad placeholder may remain in its general position even if the user scrolls forward or backward through one or more rendered HTML documents. Thus, even if additional web pages are pre-loaded due to scrolling in the forward or backward directions, the ad placeholder may remain in the same or approximately the same location on the user's screen. Alternatively, for some web pages, the ad placeholder might not appear, or might not contain an ad.

However, even though the ad placeholder may be static or relatively static, the ad contained therein may change based on the user's scrolling activities. Thus, a new ad may be loaded from a server and rendered within the placeholder. And, as discussed above, this new ad may be based on the currently-displayed or most recently-loaded web page.

The operator of the web site may use these ads as a source of revenue. The operator may sell web page ad space to third parties by the ad impression (e.g., a loading of an ad for display, or a display of an ad on a web page) or by the click-through (the user interacting with the ad, perhaps to navigate to the advertiser's web site). Thus, by displaying new ads on each web page or section, the operator may increase both impressions and click-throughs, thereby also potentially increasing the operator's ad revenue.

In some embodiments, the ads may be loaded from a different server or server cluster than the other web page content. For instance, the ads may be loaded from a dedicated ad site, which may be operated by the same entity that operates the web site, or by another entity.

g. Improved Scrolling Behavior

Some systems may allow the user to change the vertical and/or horizontal dimensions of a web browser. Doing so may change the position of one or more elements of a web page. For instance, if the width of the web browser is doubled, more of the text, images, and/or other content on the web page may be viewable in the web browser. In some situations, this may result in the web browser attempting to adjust the viewable portion of the web page so that the user can still see what was viewable before the resizing took place.

In accordance with some of the embodiments herein, resizing a web page in such a fashion might also cause a demarcation marker, or similar threshold, to be passed. As a result, another HTML document may be pre-loaded and added to the web page. Or, put another way, a non-scrolling activity may have caused behavior that would normally occur due to the user explicitly scrolling in the forward or reverse direction. The user might find the effect confusing. Thus, it may be beneficial to prevent such behavior in at least some situations.

Accordingly, if the viewable portion of a web page passes a demarcation marker or similar threshold as a result of an activity other than the user's explicit scrolling of the web page, the pre-loading of another HTML document may be skipped or suppressed. Instead, the viewable portion of the web page may be updated (e.g., to the top or bottom of the web page), and the scroll box may be adjusted to reflect the position of the viewable portion.

Another possible effect of the continuous scrolling feature is that when the user triggers the forward or back buttons of the web browser, an HTML document that may have been previously added to and then removed from the web page might be added to the web page once again. This also may cause behavior that the user does not expect.

For example, turning back to FIG. 8A, suppose that the web browser is in state 806. In this state, the scroll box is approximately in the middle of the scroll bar. Thus, the web browser is displaying approximately the middle section of the combined documents 1 and 2, which is also the bottom section of document 1.

If the user triggers the web browser's back button, the web browser may revert to state 800. However, the web browser might also attempt to keep the scroll box (and thus the viewable portion of the web page) in approximately the same location. As a result, the middle section of document 1 might be displayed. Doing so may change what the user sees, perhaps confusing or disrupting the user's reading or viewing of the web page.

To address this, the web page may include one or more scripts that adjust the viewable portion of the web page to a different part of document 1 (e.g., the top, or anywhere other than where the web browser has set the scroll position). For instance, while in state 806, these scripts may store where the top of the viewable portion is in relation to the top of each document (e.g., a pixel offset from the top or bottom of the documents). Then, in state 800, this offset may be restored for document 1.

It should be noted that this is just one example of how web browser behavior might interact with the continuous scrolling feature. Other examples may exist, and other ways of compensating for these interactions may be employed.

5. Example Operations

Figure 10:
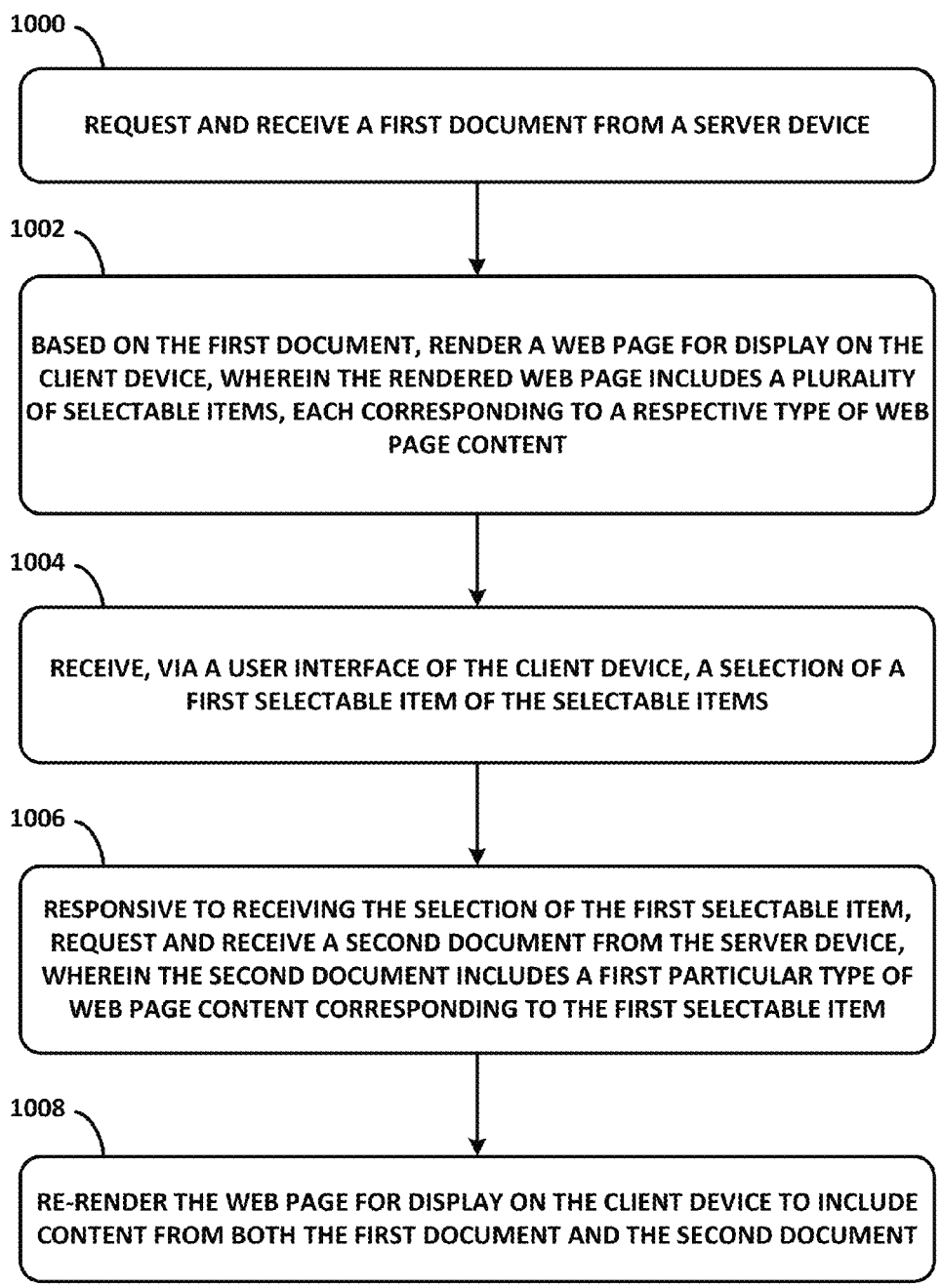
FIG. 10 is a flow chart, according to an example embodiment.

FIG. 10 is a flow chart illustrating an example embodiment. The process illustrated by FIG. 10 may be carried out by a computing device, such as computing device 200, perhaps in communication with a cluster of computing devices, such as server cluster 304. However, the process can be carried out by other types of devices or device sub-systems. For example, the process could be carried out by a client device such as a portable computer, laptop, smartphone, or tablet device. Further, the process may be combined with one or more features disclosed in the context of any previous figure. For sake of simplicity, the discussion below focuses on the operation of a client device that is executing a web browser.

At block 1000, a first document may be requested and received from a server device. At block 1002, perhaps based on the first document, a web page may be rendered for display on a client device. The rendered web page may include a plurality of selectable items, each corresponding to a respective type of web page content. For example, the selectable items may correspond to respective sections of an electronic version of a newspaper. Herein, the term "web page" may refer to a document that is suitable for rendering in a web browser or any other type of application.

At block 1004, a selection of a first selectable item of the selectable items may be received via a user interface of the client device. For instance, a user of the client device may click or tap on the first selectable item.

At block 1006, perhaps responsive to receiving the selection of the first selectable item, a second document may be requested and received from the server device. The second document may include a first particular type of web page content corresponding to the first selectable item.

At block 1008, the web page may be re-rendered for display on the client device to include content from both the first document and the second document. The content from the first document may be followed by the content from the second document.

Rendering the web page for display on the client device may involve constructing a document object model representation of the first document. Re-rendering the web page for display on the client device may involve modifying the document object model representation of the first document to also represent at least some of the second document.

In some embodiments, a selection of a second selectable item of the selectable items may be received via a user interface of the client device. Perhaps responsive to receiving the selection of the second selectable item, a third document may be requested and received from the server device. The third document may include a second particular type of web page content corresponding to the second selectable item. The web page may be further re-rendered for display on the client device to include content from both the first document and the third document. In some cases, the content from the first document may be followed by the content from the third document, and the further re-rendered web page might not include content from the second document. Alternatively, the content from the first document may be followed by the content from the second document, and the content from the second document may be followed by the content from the third document.

In some embodiments, a first URL associated with the first document may be displayed on the client device. After re-rendering the web page for display on the client device, the client device may still display the first URL. However, it may be determined that the scroll position of the re-rendered web page has a particular characteristic. Perhaps responsive to determining that the scroll position of the re-rendered webpage has the particular characteristic, a second URL associated with the second document may be displayed. The particular characteristic may involve the scroll position being below a threshold scroll position such that the re-rendered web page no longer displays content from the first document.

Further, a first URL associated with the first document may be added to a browsing history. After re-rendering the web page for display on the client device, it may be determined that the scroll position of the re-rendered web page has a particular characteristic. Perhaps responsive to determining that the scroll position of the re-rendered webpage has the particular characteristic, a second URL associated with the second document may be added to the browsing history. The second URL may follow the first URL in the browsing history.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer-readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   requesting and receiving, by a client device, a first document from a server device, the first document being one document of an ordered set of documents, the set including, in order, the first document, a second document, and a third document;
   based on the first document, rendering a web page for display on the client device, wherein the rendered web page includes a plurality of selectable items, each corresponding to a respective type of web page content;
   receiving, via a user interface of the client device, a selection of a first selectable item of the selectable items;
   responsive to receiving the selection of the first selectable item, requesting and receiving the third document from the server device, wherein the third document includes a first particular type of web page content corresponding to the first selectable item;
   re-rendering the web page for display on the client device to include content from both the first document and the third document;
   receiving, via the user interface of the client device, a selection of a second selectable item of the selectable items;
   responsive to receiving the selection of the second selectable item, requesting and receiving the second document from the server device, wherein the second document includes a second particular type of web page content corresponding to the second selectable item; and
   further re-rendering the web page for display on the client device to include content from both the first document and the second document, wherein the further re-rendered web page includes content from the first document followed by the content from the second document, and wherein the further re-rendered web page does not include content from the third document.

2. The method of claim 1, wherein the re-rendered web page includes content from the first document followed by the content from the third document.

3. The method of claim 1, wherein rendering the web page for display on the client device comprises constructing a document object model representation of the first document, and wherein further re-rendering the web page for display on the client device comprises modifying the document object model representation of the first document to also represent at least some of the second document.

4. The method of claim 1, wherein rendering the web page for display on the client device comprises constructing a document object model representation of the first document, and wherein re-rendering the web page for display on the client device comprises modifying the document object model representation of the first document to also represent at least some of the third document.

5. The method of claim 1, wherein the selectable items correspond to respective sections of an electronic version of a newspaper.

6. The method of claim 1, further comprising:
   displaying a first uniform resource locator (URL) associated with the first document; and
   after re-rendering the web page for display on the client device, still displaying the first URL.

7. The method of claim 6, further comprising:
   determining that the scroll position of the re-rendered web page has a particular characteristic; and
   responsive to determining that the scroll position of the re-rendered webpage has the particular characteristic, displaying a second URL associated with the third document.

8. The method of claim 7, wherein the particular characteristic comprises the scroll position being below a threshold scroll position such that the re-rendered web page no longer displays content from the first document.

9. The method of claim 1, further comprising:
   adding a first uniform resource locator (URL) associated with the first document to a browsing history;
   after re-rendering the web page for display on the client device, determining that the scroll position of the re-rendered web page has a particular characteristic; and
   responsive to determining that the scroll position of the re-rendered webpage has the particular characteristic, adding a second URL associated with the third document to the browsing history, wherein the second URL follows the first URL in the browsing history.

10. An article of manufacture including a non-transitory computer-readable medium, having stored thereon program instructions that, upon execution by a client device, cause the client device to perform operations comprising:
   requesting and receiving a first document from a server device, the first document being one document of an ordered set of documents, the set including, in order, the first document, a second document, and a third document;

based on the first document, rendering a web page for display on the client device, wherein the rendered web page includes a plurality of selectable items, each corresponding to a respective type of web page content;

receiving, via a user interface of the client device, a selection of a first selectable item of the selectable items;

responsive to receiving the selection of the first selectable item, requesting and receiving the third document from the server device, wherein the third document includes a first particular type of web page content corresponding to the first selectable item;

re-rendering the web page for display on the client device to include content from both the first document and the third document;

receiving, via the user interface of the client device, a selection of a second selectable item of the selectable items;

responsive to receiving the selection of the second selectable item, requesting and receiving the second document from the server device, wherein the second document includes a second particular type of web page content corresponding to the second selectable item; and further re-rendering the web page for display on the client device to include content from both the first document and the second document, wherein the further re-rendered web page includes content from the first document followed by the content from the second document, and wherein the further re-rendered web page does not include content from the third document.

11. The article of manufacture of claim 10, wherein the re-rendered web page includes content from the first document followed by the content from the third document.

12. The article of manufacture of claim 10, wherein rendering the web page for display on the client device comprises constructing a document object model representation of the first document, and wherein re-rendering the web page for display on the client device comprises modifying the document object model representation of the first document to also represent at least some of the third document.

13. The article of manufacture of claim 10, wherein the selectable items correspond to respective sections of an electronic version of a newspaper.

14. The article of manufacture of claim 10, wherein the operations further comprise:
displaying a first uniform resource locator (URL) associated with the first document; and
after re-rendering the web page for display on the client device, still displaying the first URL.

15. The article of manufacture of claim 10, wherein the operations further comprise:
adding a first uniform resource locator (URL) associated with the first document to a browsing history;
after re-rendering the web page for display on the client device, determining that the scroll position of the re-rendered web page has a particular characteristic; and
responsive to determining that the scroll position of the re-rendered webpage has the particular characteristic, adding a second URL associated with the third document to the browsing history, wherein the second URL follows the first URL in the browsing history.

16. A client device comprising:
at least one processor;
data storage; and
program instructions, stored in the data storage, that upon execution by the at least one processor cause the client device to perform operations including:
requesting and receiving a first document from a server device, the first document being one document of an ordered set of documents, the set including, in order, the first document, a second document, and a third document;
based on the first document, rendering a web page for display on the client device, wherein the rendered web page includes a plurality of selectable items, each corresponding to a respective type of web page content;
receiving, via a user interface of the client device, a selection of a first selectable item of the selectable items;
responsive to receiving the selection of the first selectable item, requesting and receiving the third document from the server device, wherein the third document includes a first particular type of web page content corresponding to the first selectable item;
re-rendering the web page for display on the client device to include content from both the first document and the third document;
receiving, via the user interface of the client device, a selection of a second selectable item of the selectable items;
responsive to receiving the selection of the second selectable item, requesting and receiving the second document from the server device, wherein the second document includes a second particular type of web page content corresponding to the second selectable item; and
further re-rendering the web page for display on the client device to include content from both the first document and the second document, wherein the further re-rendered web page includes content from the first document followed by the content from the second document, and wherein the further re-rendered web page does not include content from the third document.

* * * * *